Patented Aug. 4, 1931

1,817,614

UNITED STATES PATENT OFFICE

HENRY DREYFUS, OF LONDON, ENGLAND

MANUFACTURE OF ANHYDRIDES OF ALIPHATIC ACIDS

No Drawing. Application filed December 27, 1927, Serial No. 242,977, and in Great Britain February 8, 1927.

This invention relates to the manufacture of aliphatic anhydrides from aliphatic acids, and especially to the manufacture of acetic anhydride from acetic acid.

It was shown by Peytral (Bulletin de la Société Chimique de France XXXI pages 113–118) that acetic anhydride can be obtained by passing acetic acid vapors through metallic tubes heated at about 1150° C. In this process a yield of about 2% of acetic anhydride was obtained, and the quantity of decomposition products formed, such as gases, as given by Peytral, was very small or unsubstantial, most of the vapors from the reaction being recovered as acetic acid on condensation.

In my previous British Patent No. 279,916 of June 1, 1926 and my corresponding U. S. Patent No. 1,735,959 I have shown that the formation of acetic anhydride from acetic acid takes place to a very substantial degree or even practically quantitatively at elevated, high or very high temperatures and that the acetic anhydride so produced does not tend to re-form acetic acid so long as the water present or produced by the reaction is kept in vapor or gaseous form, and that the anhydride may be condensed and separated from the reaction gases or vapor without hydrolyzation (or substantial hydrolyzation) so long as the water is kept in the gaseous or vapor form. If, however, the gases or vapors are subjected to simple condensation and the condensate subsequently treated to separate anhydride, the anhydride is to a very large extent hydrolized back to acetic acid with a resulting poor yield of anhydride.

According to the present invention I have now found that aliphatic anhydrides (and especially acetic anhydride) may readily be prepared by subjecting the vapors of aliphatic acids (especially acetic acid) to pyrogenic decomposition in presence or absence of catalysts, and by passing the gases or vapors on leaving the hot reaction zone over or otherwise in contact with one or more of the hereinafter defined "water binding substances" maintained at a temperature or temperatures below (and preferably substantially below) the temperature obtaining in the hot reaction zone.

Preferably, to avoid condensation of the water vapor with attendant hydrolysis of anhydride, the water binding substances are employed at temperatures above the boiling point of water under the conditions of pressure obtaining (for instance normal atmospheric pressure, reduced pressure or "vacuum"); and preferably the water binding substances are employed at temperatures higher than the boiling point of the anhydride (i. e. the boiling point under the conditions of pressure obtaining), in which case the water vapor can be substantially absorbed from the reaction gases or vapors and the anhydride pass on in vapor form. Nevertheless in performing the invention, temperatures below the boiling points of the anhydride and of water may be employed.

The temperatures at which any particular water binding substances are employed are preferably such that the water binding substances have substantial affinity for water and preferably (in so far as consistent with the other desiderata of the process) the temperatures are such that the water binding substances have their maximum affinity for water. The water binding substances will of course be employed at temperatures below those at which all the water (whether water chemically bound or water of crystallization) would be driven off from the products resulting from their absorption of water.

By the term "water binding substances" I mean bisulphates, pyrosulphates (especially bisulphates and pyrosulphates of the alkali and earth alkali metals), zinc chloride, calcium chloride, ortho phosphoric acid, pyrophosphoric acid, metaphosphoric acid and like substances which have affinity (and preferably high affinity) for water but excluding substances having a deleterious effect on aliphatic acids or anhydrides, such as sulphuric acid.

In performing the invention the vapor of acetic acid or other aliphatic acid may be subjected to pyrogenic decomposition in any known or suitable way to form the reaction gases or vapors. For instance the vapor may be passed through tubes (or other apparatus forming the hot reaction zone) heated electrically or otherwise to the desired temperature, and packed or otherwise provided with catalysts should their use be desired. The pyrogenic decomposition may be performed at temperatures of from about 200° to 1200° C. and it is especially advantageous to employ relatively high temperatures for example temperatures of from about 700° to 1000°. With the higher temperatures it is preferable to have increased speed of passage of the vapors to avoid the formation of decomposition products.

Any known catalysts may if desired be employed for the pyrogenic decomposition, for example those described in my prior British specifications Nos. 257,968 of April 9, 1925, 256,664 of April 9, 1925, and 280,972 and corresponding U. S. Patents 1,735,956, 1,735,958 and 1,735,962 though the use of catalysts is not necessary for performing the present invention.

Further it is to be understood that I do not limit myself to the concentration of the acetic acid or other aliphatic acid (or mixtures of such acids) to be employed, as the present invention enables aliphatic anhydrides to be produced from dilute or concentrated or "glacial" aliphatic acids; it also affords valuable means for recovering waste or industrial dilute acetic acid resulting from industrial acetylation processes for example such as are obtained in the manufacture of cellulose acetate.

On leaving the hot reaction zone the gases or vapors are passed over or otherwise in contact with one or more of the hereinbefore defined water binding substances maintained at a temperature or temperatures below (and preferably substantially below) the temperature obtaining in the hot reaction zone. Preferably to avoid condensation of water vapor with attendant hydrolysis of the anhydride, the water binding substances are employed at temperatures above the boiling point of water under the conditions of pressure obtaining (for instance normal atmospheric pressures or reduced pressure or "vacuum"); and preferably the water binding substances are employed at temperatures higher than the boiling point of the anhydride (i. e. the boiling point under the conditions of pressure obtaining), in which case the water vapor can be substantially absorbed from the reaction gases or vapors and the anhydride pass on in vapor form. As before mentioned, the temperatures at which any particular water binding agents are employed are preferably such that the water binding substances have substantial affinity for water and preferably (in so far as consistent with the other desiderata of the process) the temperatures are such that the water binding substances have their maximum affinity for water. As before mentioned, the water binding substances will of course be employed at temperatures below those at which all the water (whether water chemically bound or water of crystallization) would be driven off from the products resulting from their absorption of water.

In performing the invention the water binding substances may be employed in the solid, liquid or molten condition and may if desired be subjected to stirring or other agitation. The water binding substances may be regenerated after removal from the absorption zone, or, if desired, they may be regenerated continuously with the reaction, for example (especially when employed in the liquid form or in the molten state), they may be caused to circulate continuously from the absorption zone through a regeneration apparatus and then returned to the absorption zone. The regeneration may be effected by heating the "water binding substances" to remove water bound or absorbed thereby.

The reaction gases or vapors after passing in contact with water binding substances, and preferably after removal of the anhydride, may be caused to pass again through the hot reaction zone and thence in contact with the water binding substances, and in this manner the process can be performed in a continuous operation or cycle, fresh aliphatic acid vapor being admitted to the system as desired or required.

If desired, the regeneration of the water binding substance or substances may be performed under reduced pressure of "vacuum" to remove the water bound or absorbed thereby.

If desired the process may be performed under reduced pressure or "vacuum."

The following example illustrates one form of execution of the invention it being understood that it is given only by way of illustration and may be varied widely.

Example

Acetic acid vapor, generated by heating glacial acetic acid is passed in a stream through a copper or fireclay tube heated to 800° to 1000° C.; the resulting gases or vapors are passed over sodium pyrosulphate, sodium bisulphate or phosphoric acid which is maintained at a temperature or temperatures of from about 150° to 350° and preferably about 150 to 200°, whereby water vapor is substantially absorbed and the anhydride passes on in vapor form. After passing over the sodium pyrosulphate, sodium bisulphate, or phosphoric acid the reaction gases or vapors may be cooled to condense the anhydride or may be subjected to fractional condensation, for instance by passing them upwards through one or more fractionating columns,

What I claim and desire to secure by Letters Patent is:—

1. Process for the manufacture of an aliphatic anhydride which comprises subjecting the vapor of an aliphatic acid to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone.

2. Process for the manufacture of acetic anhydride which comprises subjecting acetic acid vapor to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone.

3. Process for the manufacture of an aliphatic anhydride which comprises subjecting the vapor of an aliphatic acid to pyrogenic decomposition by passing said vapor through a reaction zone heated to a temperature between 700° and 1000° C., permitting the reaction vapors to leave said heated reaction zone and thereafter passing the reaction vapors in contact with at least one water binding agent that has no deleterious effect upon the products of the process maintained at a temperature below that obtaining in the heated reaction zone.

4. Process for the manufacture of acetic anhydride which comprises subjecting the vapor of acetic acid to pyrogenic decomposition by passing said vapor through a reaction zone heated to a temperature between 700° and 1000° C., permitting the reaction vapors to leave said heated reaction zone and thereafter passing the reaction vapors in contact with at least one water binding agent that has no deleterious effect upon the products of the process maintained at a temperature below that obtaining in the heated reaction zone.

5. Process for the manufacture of an aliphatic anhydride which comprises subjecting the vapor of an aliphatic acid to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone and above the boiling point of water.

6. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone and above the boiling point of water.

7. Process for the manufacture of an aliphatic anhydride which comprises subjecting the vapor of an aliphatic acid to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone and above the boiling point of the anhydride.

8. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone and above the boiling point of acetic anhydride.

9. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with at least one water binding agent that has no deleterious effect upon the products of the process maintained at a temperature below that obtaining in the heated reaction zone and between 150° and 200° C.

10. Process for the manufacture of an aliphatic anhydride which comprises subjecting the vapor of an aliphatic acid to pyrogenic decomposition in a heated reaction zone, permitting the reaction vapors to leave said heated reaction zone and thereafter passing the reaction vapors in contact with an alkali pyrosulphate maintained at a temperature below that obtaining in the heated reaction zone.

11. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with an alkali pyrosulphate maintained at a temperature below that obtaining in the heated reaction zone.

12. Process for the manufacture of an aliphatic anhydride which comprises subjecting the vapor of an aliphatic acid to pyrogenic decomposition in a heated reaction zone, permitting the reaction vapors to leave said heated reaction zone and thereafter passing the reaction vapors in contact with sodium pyrosulphate maintained at a temperature below that obtaining in the heated reaction zone.

13. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with sodium pyrosulphate maintained at a temperature below that obtaining in the heated reaction zone.

14. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with an alkali pyrosulphate maintained at a temperature below that obtaining in the heated reaction zone and above the boiling point of water.

15. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with an alkali pyrosulphate maintained at a temperature below that obtaining in the heated reaction zone and above the boiling point of acetic anhydride.

16. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with sodium pyrosulphate maintained at a temperature below that obtaining in the heated reaction zone and above the boiling point of water.

17. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with sodium pyrosulphate maintained at a temperature below that obtaining in the heated reaction zone and above the boiling point of acetic anhydride.

18. Process for the manufacture of acetic anhydride which comprises subjecting the vapor of acetic acid to pyrogenic decomposition in a heated reaction zone, permitting the reaction vapors to leave said heated reaction zone and thereafter passing the reaction vapors in contact with sodium pyrosulphate maintained at a temperature below that obtaining in the heated reaction zone and between 150° and 200° C.

19. Process for the manufacture of acetic anhydride which comprises passing acetic acid vapor successively through a copper tube heated to a temperature between 800° and 1000° C., over sodium pyrosulphate maintained at a temperature between 150° and 200° C., and thereafter condensing the vapors to recover the acetic anhydride.

In testimony whereof I have hereunto subscribed my name.

HENRY DREYFUS.